United States Patent [19]

Harrell

[11] Patent Number: 5,020,603
[45] Date of Patent: * Jun. 4, 1991

[54] REVERSIBLE PLOW

[76] Inventor: Danny H. Harrell, Rte. 3, Camillia, Ga. 31799

[*] Notice: The portion of the term of this patent subsequent to Mar. 19, 2008 has been disclaimed.

[21] Appl. No.: 470,062

[22] Filed: Jan. 25, 1990

[51] Int. Cl.$^5$ .............................................. A01B 3/28
[52] U.S. Cl. ................................. 172/131; 172/219; 172/666; 172/704; 172/772
[58] Field of Search ................ 172/126, 127, 130, 131, 172/204, 210, 213, 215, 219, 225, 271, 314, 290, 291, 666, 719, 754, 772, 439, 702-704, 222, 763; 280/451

[56] References Cited

U.S. PATENT DOCUMENTS

| | | | |
|---|---|---|---|
| 128,393 | 6/1872 | Heiway et al. | 172/704 |
| 300,502 | 6/1884 | Rapp . | |
| 352,849 | 11/1886 | Ball . | |
| 375,802 | 1/1888 | Clark . | |
| 717,087 | 12/1902 | Fairbank . | |
| 718,831 | 1/1903 | Ehler . | |
| 772,367 | 10/1904 | McLaughlin | 172/704 X |
| 785,474 | 3/1905 | Burkhart . | |
| 801,711 | 10/1905 | Collins . | |
| 934,575 | 9/1909 | Schreiber | 172/130 |
| 1,134,149 | 4/1915 | Mowry . | |
| 1,221,764 | 4/1917 | Mansfield . | |
| 1,230,963 | 6/1917 | Westbrook | 172/704 |
| 1,945,930 | 2/1934 | Birrer . | |
| 2,304,383 | 12/1942 | Standland . | |
| 2,752,836 | 7/1956 | Pilch . | |
| 2,764,076 | 9/1956 | Fowler | 172/219 X |
| 2,780,977 | 2/1957 | Browning | 172/130 X |
| 2,824,505 | 2/1958 | Coviello | 172/222 X |
| 2,913,060 | 11/1959 | Owen et al. | 172/271 X |
| 3,042,120 | 7/1962 | Heckathorn et al. . | |
| 3,101,789 | 8/1963 | Jennings . | |
| 3,115,191 | 12/1963 | Ward . | |
| 3,126,969 | 3/1964 | Sewell | 172/719 |
| 3,186,496 | 6/1965 | Cox et al. | 172/383 X |
| 3,305,025 | 2/1967 | Johnson et al. | 172/218 |
| 3,305,026 | 2/1967 | Fulton . | |
| 3,554,294 | 1/1971 | Morkosi . | |
| 4,019,753 | 4/1977 | Kestel . | |
| 4,037,856 | 7/1977 | Medlin et al. | 280/446 B |
| 4,078,819 | 3/1978 | Yatcilla et al. | 280/462 |
| 4,165,787 | 8/1979 | Perkins | 172/219 |
| 4,185,700 | 1/1980 | Atherton et al. | 172/796 |
| 4,189,007 | 2/1980 | Revett et al. | 172/224 |
| 4,211,286 | 7/1980 | Allen | 172/222 |
| 4,365,672 | 12/1982 | Robinson, Jr. et al. | 172/130 X |
| 4,415,040 | 11/1983 | Salva | 172/225 |
| 4,553,605 | 11/1985 | Katayama . | |
| 4,553,609 | 11/1985 | Salva | 172/647 |
| 4,592,429 | 6/1986 | Watts | 172/212 |
| 4,646,849 | 12/1987 | Watvedt | 172/225 |
| 4,778,013 | 10/1988 | Van der Lely | 172/225 |
| 4,800,963 | 1/1989 | Gomez | 172/219 |
| 4,869,327 | 9/1989 | Korf . | |
| 4,942,928 | 7/1990 | Gomez | 172/219 |

FOREIGN PATENT DOCUMENTS

| | | | |
|---|---|---|---|
| 214856 | 9/1956 | Australia | 172/222 |
| 1368437 | 6/1964 | France . | |
| 2390079 | 1/1979 | France | 172/219 |
| 643998 | 8/1962 | Italy . | |
| 812199 | 3/1981 | U.S.S.R. . | |
| 912069 | 3/1982 | U.S.S.R. . | |
| 178786 | 4/1922 | United Kingdom | 172/219 |
| 568763 | 4/1945 | United Kingdom | 172/704 |
| 2033192 | 5/1980 | United Kingdom | 172/271 |
| 1603204 | 11/1982 | United Kingdom . | |

OTHER PUBLICATIONS

"Long Nu-Way, Swing Two Way Plow", photographs from Greenville Mid-Atlantic Farm Show, Nov. 1989.

*Primary Examiner*—Randolph A. Reese
*Assistant Examiner*—Jeffrey L. Thompson
*Attorney, Agent, or Firm*—Hurt, Richardson, Garner, Todd & Cadenhead

[57] ABSTRACT

A reversible plow comprising a three point hitch, a pivotally mounted tool bar provided with a plurality of adjustable plow gangs, and gauge wheels wherein said tool bar can be shifted from left of center to right of center, and back, by a hydraulic piston such that the plowed ground can be directed in a desired direction.

14 Claims, 10 Drawing Sheets

REVERSIBLE PLOW

FIELD OF THE INVENTION

This invention relates to plows and is more particularly concerned with a reversible plow which will selectively throw the dirt from a furrow, in one direction or the other, as desired.

BACKGROUND OF THE INVENTION

In the past, reversible plows have been developed which will selectively direct the plowed ground in one direction or the other. The BI-DIRECTIONAL MOLDBOARD PLOW WITH MOLDBOARD FRAME INCLUDING GUIDE MEMBER disclosed in U.S. Pat. No. 4,800,963 issued Jan. 31, 1989 to Pompeyo B. Gomez discloses a reversible plow. In the structure of the patent, a tool bar carries a plurality of moldboards which are mounted in alignment at spaced locations along the length of the tool bar, two moldboards being forward of a central pivot pin and two moldboards being rearwardly of the central pivot pin. A main frame carries the moldboard frame while a reversing arm, which cooperates with the moldboard frame and is operated hydraulically, pivots the moldboard frame from one angular position to the other with respect to the frame.

In the Gomez device, each moldboard is carried in a fixed location by a tool bar and each moldboard has removable wear parts, thereon. The frame has a three point hitch and a tilting mechanism by which one side of the hitching frame can be lifted or lowered with respect to the tractor.

BRIEF DESCRIPTION OF THE INVENTION

Briefly described, the present invention includes a main frame having a three point hitch for a tractor by which the frame may be towed or lifted, as desired. In the main frame carries a tool bar which is pivotally mounted at the rear central portion of the main frame, the tool bar being provided with a plurality of plow gangs which are clamped on to the tool bar, the plow gangs being adjustable along the length of the tool bar. This main frame also includes a pair of gauge wheels at its front portion while the plow gang has a rear gauge wheel at its rear most portion, this rear gauge wheel being capable of tracking the path of movement of the tractor.

The tool bar of the present invention can be shifted from left of center to right of center by a hydraulic piston and cylinder, the plow gangs being so arranged on the tool bar that when shifted, the pressure on the moldboards will tend to hold the tool bar in its pivoted position. Each plow gang has a shank which is removably clamped to the tool bar and carries a pivotally adjustable moldboard, having two points and an arc surface. The brackets which carry the moldboard and connect the moldboard to shank is pivotal about a horizontal axis so as to adjust the tilt of the moldboard.

Connected to the rear wheel assembly is a row marker which is tiltable by a hydraulic cylinder, the function of which is synchronized with the hydraulic cylinder operating the tool bar so as to always arrange one end of the row marker assembly up and the other end down or vice-versa so that the lower end produces a line along the ground to mark the path of travel along which the next subsequent row will be plowed.

In a second embodiment of the present invention, the frame of the plow is carried by a centrally located longitudinal extending pivot pin so that it is rotated by a hydraulic cylinder about the center line of the tractor. By such an arrangement, a tractor can have one wheel in the furrow as the frame of the plow is tilted about a central longitudinal axis to remain horizontal for uniform plowing action.

Accordingly it is an object of the present invention to provide a reversible plow which is inexpensive to manufacture, durable in structure and efficient in operation.

Another object of the present invention is to provide a reversible plow in which the various parts may be readily and easily replaced.

Another object of the present invention is to provide a moldboard assembly wherein the moldboard, when engaging a large rock or other obstacle, shears a pin and tilts rearwardly, so as to reduce or eliminate damage to the moldboard.

Another object of the present invention is to provide a reversible plow which is capable of efficient use in varying types of land and which can be adjusted to optimum operating condition for that particular land.

Another object of the present invention is to provide a reversible plow which can provide maximum covering of the trash and litter which is on the ground being plowed.

Another object of the present invention is to provide a reversible plow in which the moldboards of the plow can be readily and easily adjusted along with length of the tool bar.

Another object of the present invention is to provide a reversible plow in which the moldboards carried by the plow will essentially equally penetrate to a prescribed depth in the ground.

Another object of the present invention is to provide a reversible plow in which the frame of the plow can be tilted about a central axis so as to maintain the plow level as the tractor plows in the furrow.

Another object of the present invention is to provide a reversible plow which will automatically mark a path for a subsequent row to be plowed.

Another object of the present invention is to provide a reversible plow in which additional moldboards may be readily and easily installed on the plow.

Another object of the present invention is to provide a reversible plow in which the tool bar is pivotal from one annular position to the other with respect to the path of travel of the plow and wherein the moldboards carried by the plow tend to maintain the tool bar in its pivoted position.

Another object of the present invention is to provide a reversible plow in which the effective width of the plow can be varied.

Another object of the present invention is to provide a reversible plow in which the moldboards will impart a more rolling effect to the displaced ground as the furrows are being plowed by the moldboard.

Another object of the present invention is to provide a reversible plow in which the moldboards will produce a plowed ground having fewer clogs and smaller clogs after such plowing.

Another object of the present invention is to provide a reversible plow in which the depth of plowing is maintained substantially constant during the plowing operation.

DETAILED DESCRIPTION

Figure 1:
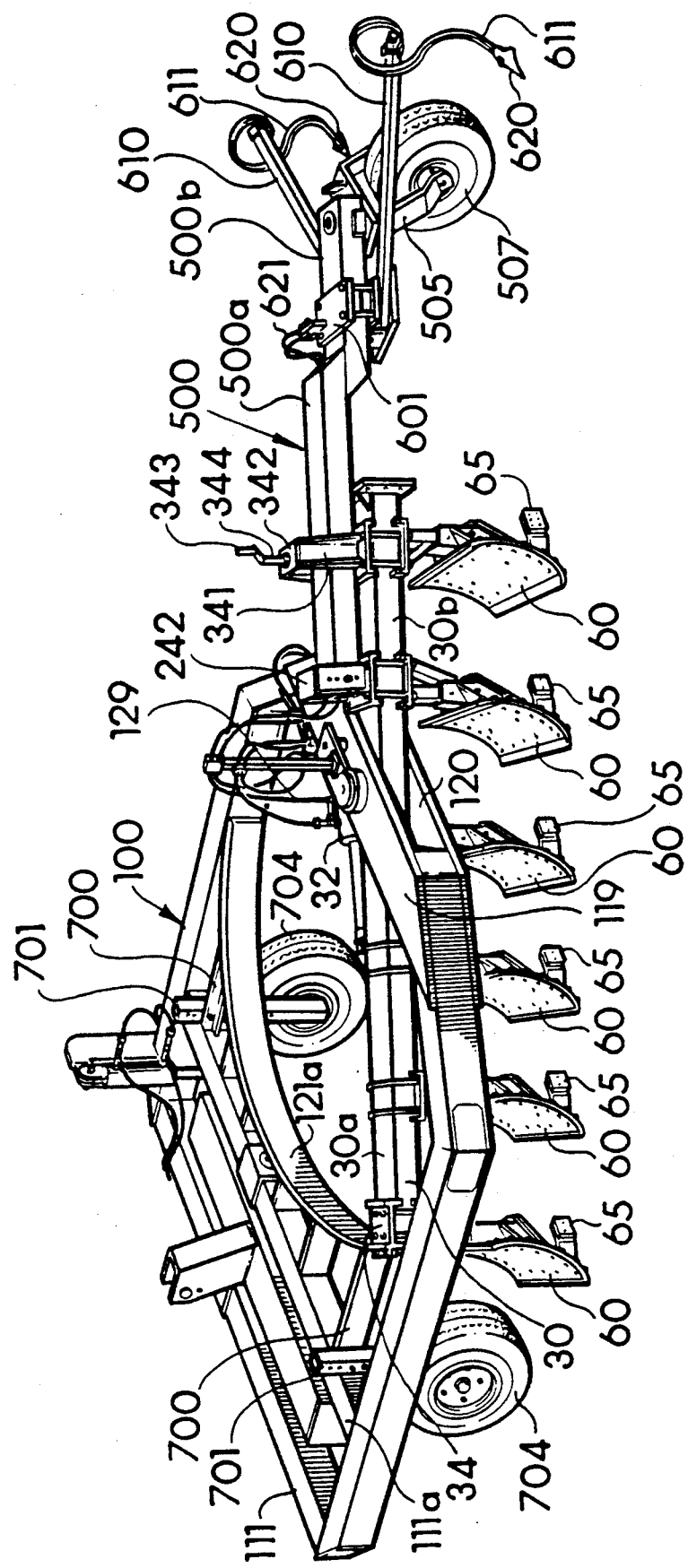
FIG. 1 is perspective view of an in-the-furrow reversible plow constructed in accordance with the present invention.
Figure 1A:
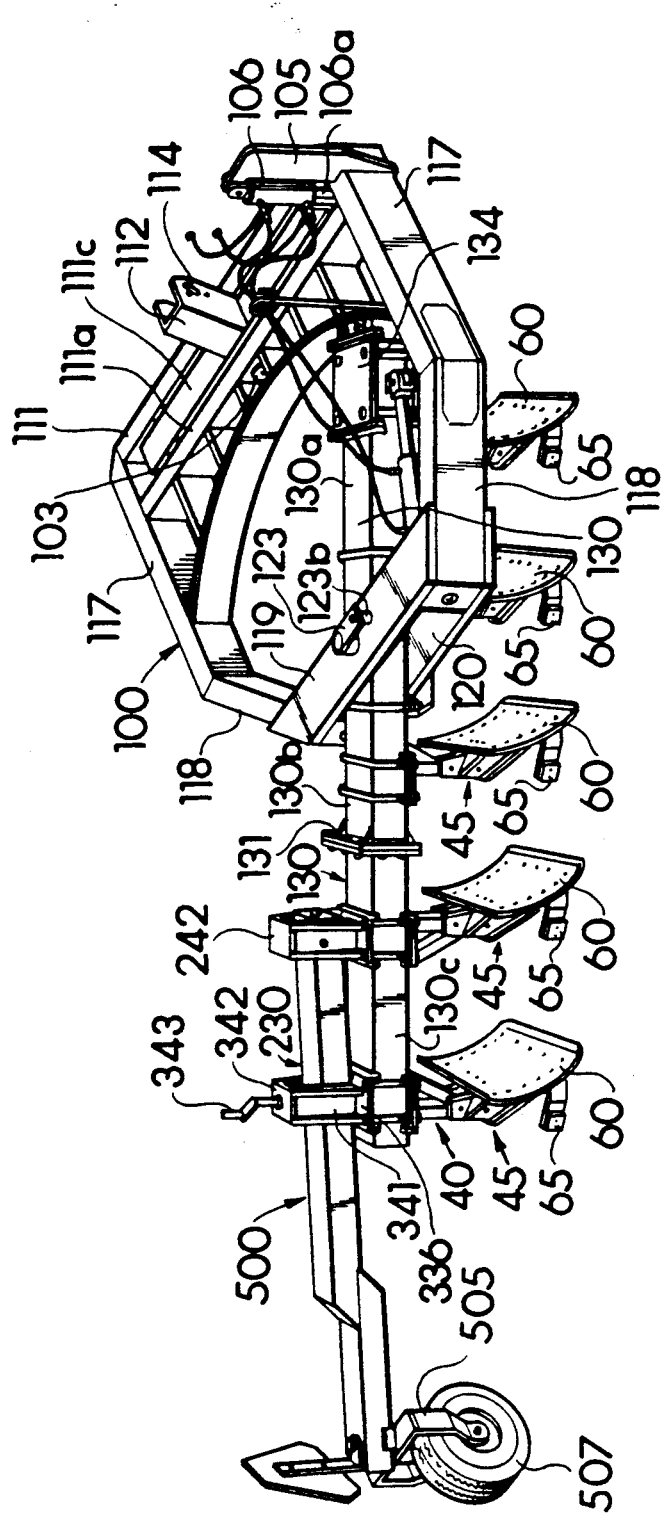
Figure 2:
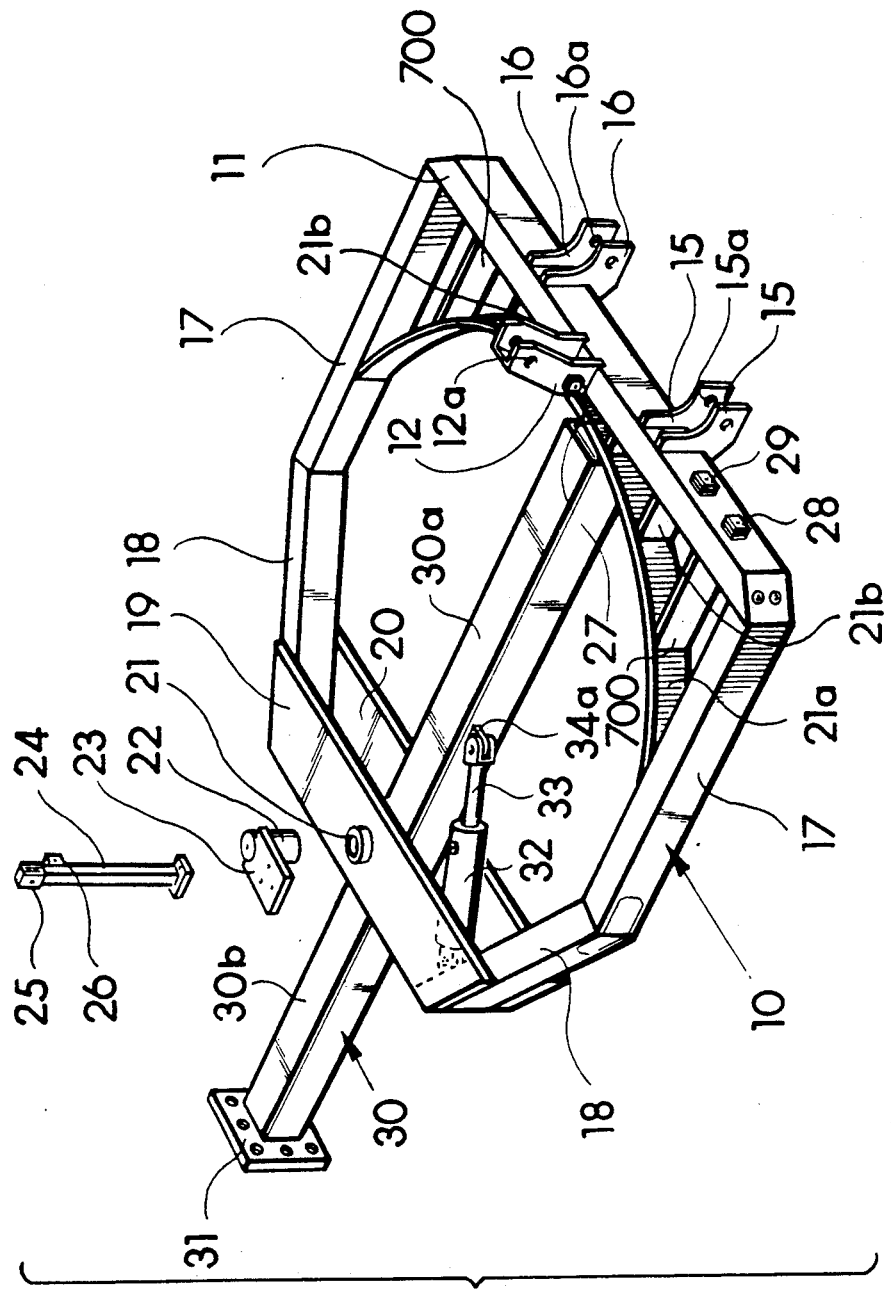
FIG. 2 is a perspective view of the frame assembly and tow bar of an on-land reversible plow constructed in accordance with the present invention.

Referring now in detail to the embodiments chosen for the purpose of illustrating the present invention, numeral 10 in FIG. 2 denotes generally a horizontal, trapezoidal main frame of an on-the-land reversible plow of the present invention. Numeral 100 in FIGS. 1 and 2a denotes generally the in-the-furrow reversible plow of the present invention, which will be explained, later.

The front tow bar or ross bar 11 of frame 10 of the on-the-land plow of FIG. 2 extends transversely with respect to the path of travel of the plow. In the central portion of the crossbar 11 are a pair of opposed upwardly and forwardly extending central hitch plates 12, each of which is provided with a pair of vertically spaced holes 12a and 12b. The holes 12a are transversely aligned with each other and the holes 12b are transversely aligned with each other so that a pin (not shown) can pass through either the holes 12a or the holes 12b to connect the plow to the central hitch of a tractor (not shown).

Outwardly of the central hitch plates 12 on crossbar 11 are opposed pairs of lower hitch plates 15 and 16. Each hitch plate 15 is provided with a hole 15a and each hitch plate 16 is provided with a hole 16a, the holes 15a and 16a being transversely aligned with each other to receive pins (not shown) which secure the hitch plates 15 and 16 to the lower hitches of a tractor (not shown) so that the action of the three point hitch can raise and lower the plow, as desired.

In more detail, the frame 10 in FIG. 2 includes a pair of transversely spaced, opposed, longitudinally extending, parallel, side bars 17 which extend rearwardly from the end portions of the crossbar 11. Connected to the rear ends of these side bars 17 are a pair of rearwardly converging bars 18, the rearmost ends of which are joined by upper and lower transverse plates 19 and 20 these plates 19 and 20 being in vertically spaced, opposed relationship, parallel to each other. In the central portion of the plates 19 and 20, are vertically aligned holes, such as hole 21, which receive therethrough a pivot pin 22. The holes 21 are aligned longitudinally with the longitudinal axis of the plow and, therefore, are aligned with the space between the central hitch plates 12.

The upper portion of the pivot pin 22 is provided with a mounting plate 23 which bolts to plate 19 to hold pin 22 in place. Plate 23 carries an upstanding, conduit supporting standard 24, the upper end portion of which is provided with conduit guides 25 and 26. Also, a side conduit guide 27 is provided on one of the plates 12. These conduit guides 25, 26, and 27 receive and support increments of the hydraulic hoses, such as hose 129 of FIG. 1, by which the hydraulic cylinders, to be hereinafter described, are controlled from the tractor. Additional conduit guides 28 and 29 are provided on the front side of the cross bar 11.

A guide bar 121a which is concaved rearwardly, being concentric about the axis of pin 22, has its ends secured to the side bars 17, respectively. A plurality of transversely spaced, longitudinally extending, ribs 21b extend between the front bar 11 and the convexed side of guide bar 21a so as to fix the position of guide bar 21a within and in the plane of the forward portion of frame 10.

Figure 2A:
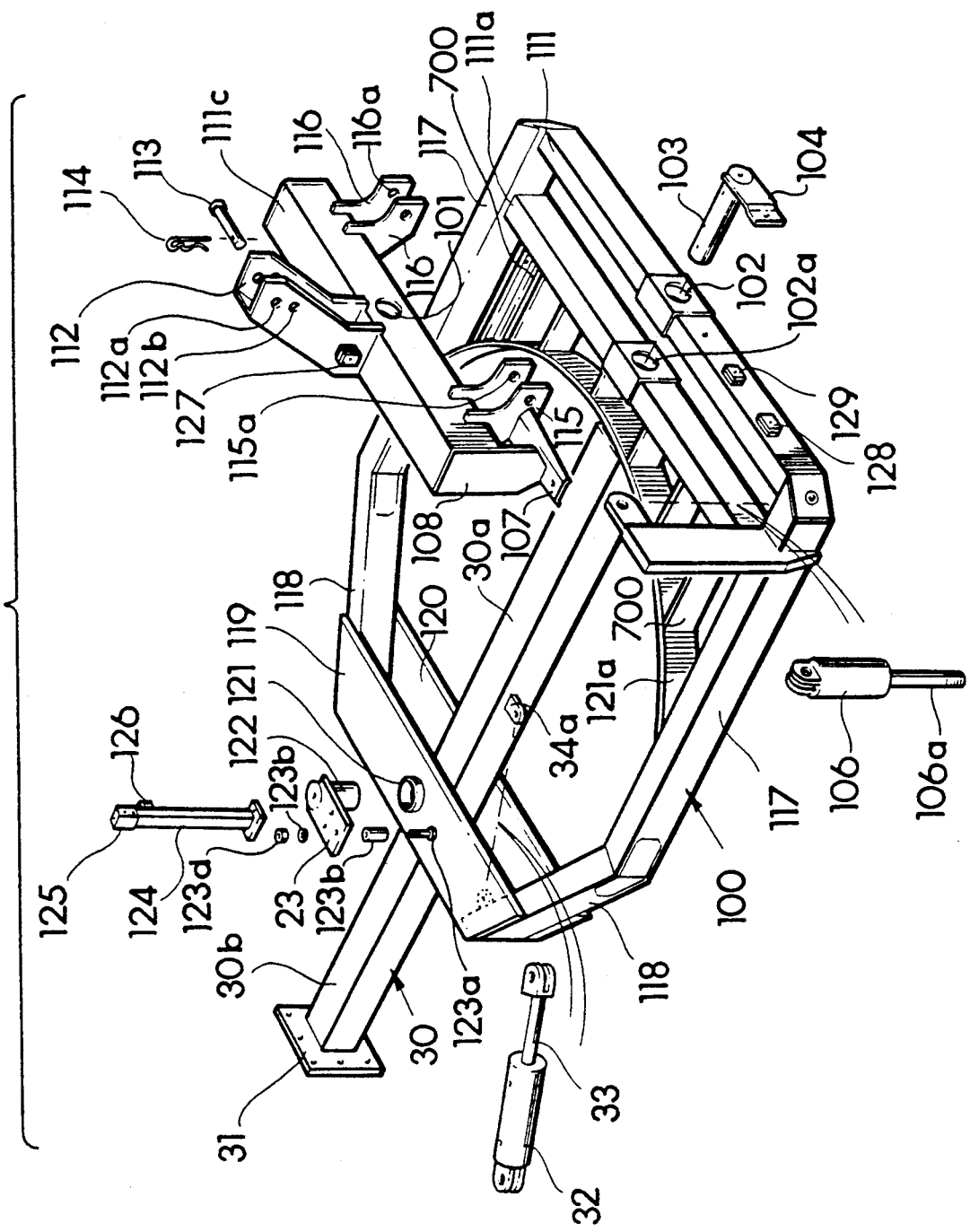
FIG. 2A is an exploded perspective view of the frame and tow bar of the plow depicted in FIG. 1.

An alternate form of main frame 100 which can be substituted for frame 10 is illustrated in FIG. 1 and FIG. 2a. This alternate frame 100 is used for an in-the-furrow reversible plow. In more detail, frame 100 includes a pair of parallel, longitudinally spaced, transversely extending, cross-bars 111 and 111a. Opposed parallel, longitudinally extending, side bars 117 extend rearwardly from the ends of front cross bar 111, being secured to the ends of rear bar 111a. These side bars 117 extend rearwardly of cross bar 111a and connect by their rear end portions to a pair of rearwardly and inwardly converging bars 118, the rearmost ends of which are joined by upper and lower vertically spaced, transversely extending, plates 119 and 120.

Like the preceding embodiment, the plates 119 and 120 are provided with holes, such as hole 121, through which protrudes a pivot pin 122 which carries a swingable tool bar 30 to be described, hereinafter. The upper portion of pivot pin 22 is provided with a mounting plate 123. An upstanding bolt 123a on plate 119 is provided with a spacer sleeve 123b which is shorter than the bolt 123a so that when the pivot pin 122 is appropriately in place, bolt 123b protrudes through plate 123 and receives the washer 123c and nut 123d for locking the pin 122 in place.

An upstanding standard 124 is mounted on the plate 124 and carries conduit guides 125 and 126. Other conduit guides 128 and 129 are on the front of bar 111.

Rearwardly of the rear crossbar 111a is a concaved guide bar 121a which is secured with the frame 100 by transversely spaced ribs 121b.

Between the parallel crossbars 111 and 111a is a tow bar 111c, provided with a central longitudinal hole 101 which, when aligned with aligned holes 102 and 102a in the central portions of crossbars 111 and 111a, will receive a longitudinally extending pivot pin 103 which extends along the longitudinal axis of frame 100. The pivot pin 103 has a plate 104 on its end which plate is removably bolted to bar 111. Thus, the frame 100 will pivot about the longitudinal central axis of pivot pin 103.

The central portion of tow bar 111c, above hole 101, carries a central hitch 112, consisting of an upstanding and forwardly extending channel member having spaced plates, pivotally connects to the tractor (not shown), by means of a removable pin 113 which selectively protrudes through aligned holes 112a or 112b in plates of the hitch 112. A keeper 114 is provided on pin 113.

Outwardly of the central hitch 112 and protruding downwardly from both end portions of bar 111c are opposed pairs of hitch plates 115 and 116. Each pair of hitch plates 115 are provided with transversely aligned holes 115a and each pair of hitch plates 116 are provided with aligned holes 116a. Pins, similar to pin 113 respectively pass through holes 115 and 116 for removably securing the side hitches of the tractor to the hitch plates 115 and 116.

An upstanding piston support 105 supports the upper end of a double hydraulic piston 106, the piston rod 106a of which pivotally connects to a tilt plate 107 which plate protrudes laterally outwardly from hitch 115 and an end brace 108 on the end of bar 111c. The pivotal mounting of rod 106a to plate 107 is achieved by the rod 106a passing through an oversized hole in plate 107 and have nuts (not shown) on the threaded end of rod 106a, the nuts forming stops for both surfaces of plate 107.

The passing of hydraulic fluid from the tractor to one side or the other of piston 106 will cause the incremental tilting of the frame 100 about the generally horizontal axis of pivot pins 103 as the tow bar 111c remains in its same prescribed position with respect to the tractor.

Thus, the frame 100 can be positioned in a horizontal position even though one rear wheel of the tractor is in the furrow, thereby positioning the tractor at an angle with respect to the plane of the ground.

The remaining portion of this description has applicability to both types of frames 10 and 100 as will be apparent to those skilled in the art.

The pivot pin 22 protrudes through an appropriate hole (not shown) in a straight, swingable, tool bar 30 which is rectangular in cross section, the tool bar 30 being sufficiently narrow that it passes between the opposed plates 19 and 20 or 119 and 120. A major portion 30a of the tool bar 30 protrudes forwardly within the frame 10 or 100 and terminates with its forward end adjacent to the curved or arcuate guide bar 21a or 121a. The tool bar 30 is thus free to pivot about the vertical axis of the pivot pin 22 or 122 so that the forward end of tool bar 30a will swing from one end portion of the guide bar 21 or 121 to the other end portion of the guide bar 21 or 121. The swing to the left from the longitudinal axis of the plow is between about 38° and about 40° and the swing to the right from the longitudinal axis of the plow is also about 38° to about 40°. The major portion 30a of the length of the tool bar 30 of the on land plow is between the pivot pin 22 and the guide bar 21, and a minor portion 30b is rearwardly of pin 22.

Figure 11:
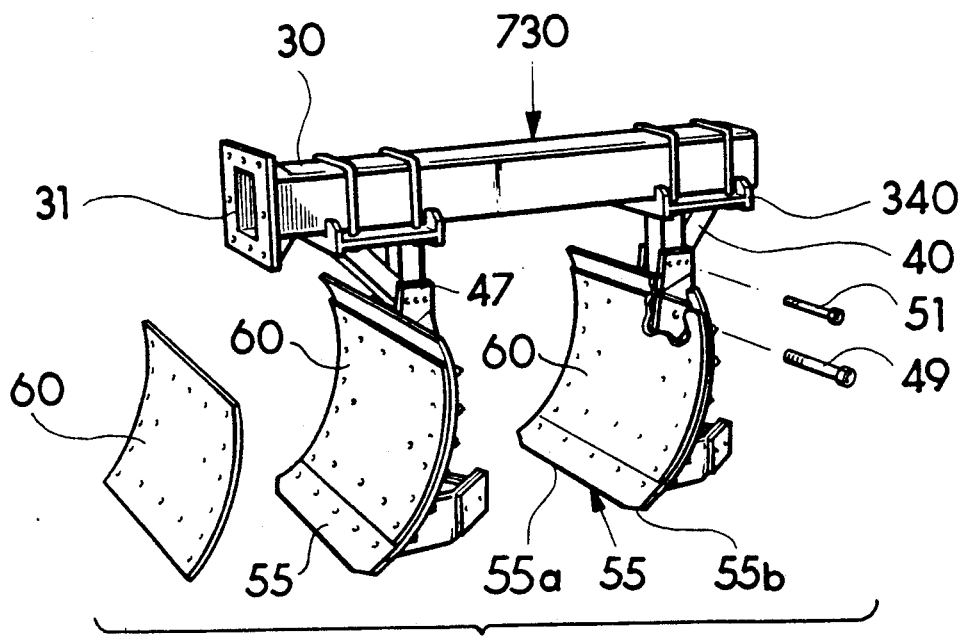
FIG. 11 is an exploded perspective view of a tool bar extension with the moldboards and mounting assemblies secured thereto.

The rear portion 30b of the tool bar 30 protrudes rearwardly from the frame 10 or 100 and is provided at its rear end with an upstanding butt plate 31 which is perpendicular to the axis of bar 30 and against which the extension of FIG. 11 can be removably affixed.

For hydraulically shifting the tool bar 30 from its extreme left position to its extreme right position and vice versa, a double acting hydraulic cylinder 32 is pivotally connected by its rear end portion to the rearmost inner surface of one of the converging bars 18 or 118. The piston rod 33 of this double acting cylinder 32 is pivotally connected by its forward end portion to a sidewise extending bracket 34 on the side of the formed portion 30a of the tool bar 30. The arrangement of the cylinder 32 is such that, when the piston 33 is retracted, the forward portion 30a of the tool bar 30 will be swung to its right position in FIG. 2 or FIG. 2a and when the piston rod 33 is extended, the forward portion 30a of the tool bar 30 will be swung to its leftmost position.

Figure 3:
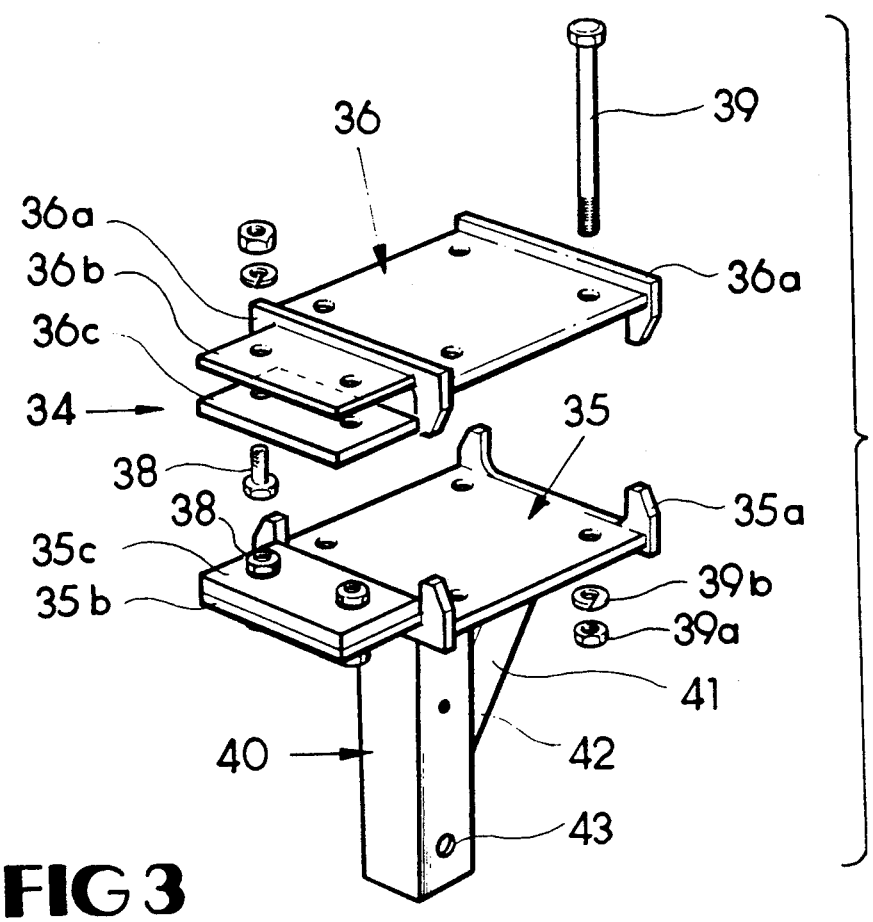
FIG. 3 is an exploded perspective view of a detail showing the front shank or mounting bracket for the moldboard of the present invention.

At the forward end portion of the tool bar 30 is a front plow gang having a front shank assembly 34, shown in FIG. 1 and FIG. 3. This front shank assembly 34 serves a double function of forming a guide for the front end of the tool bar 30 and as a moldboard support for the frontmost moldboard assembly seen in FIG. 4. In more detail, the front gang includes the front shank assembly 34 which has forwardly protruding lower square or rectangular plate 35 and an upper plate 36 respectively adapted to be received adjacent the bottom surface and top surface of the front end portion 30a of the tool bar 30. The plates 35 and 36, along their front and rear edge portions receive C-shaped, opposed, inwardly facing, flat cradles 35a and 36a which when the plates 35 and 36 are clamped together limit both longitudinal and lateral movement of the plates 35 and 36 on the tool bar 30.

Protruding forwardly from the forward plates 35a and 36a, respectively, are a pair of vertically spaced, rectangular wear plate retaining members 35b and 36b. Removable plastic wear plates 35c and 36c are bolted, respectively, to the opposed surfaces of these members 35b and 36b by bolts 38. The plates 35 and 36 are removably secured to each other by bolts, such as bolt 39, through corner portions of plates 35 and 36 passing outwardly adjacent to the sides of the tool bar 30. Thus, when a nut, such as nut 39a with its lock washer 39b are tightened on the bolts, such as bolt 39, the opposed plates 35 and 36 are urged together so as to clamp an increment of the tool bar 30, therebetween.

When the plates 35 and 36 are appropriately installed, respectively adjacent to the top and bottom of the end portion of bar 30, the plastic wear plates 35c and 36c which protrude forwardly of bar 30, straddle and bear against the lower and upper edges of the guide bar 21 so as to slide therealong as the tool bar 30 is shifted from one position to the other. These wear plates 35c and 36c can be readily replaced when they have become worn by removing the bolts 38. The plates 35c and 36c function to stabilize the vertical position of the front end portion of the tool bar 30.

Protruding downwardly, in generally a vertical direction, from the bottom plate 35 is a moldboard assembly mounting shank 40. This mounting shank 40 is a channel member which is welded by its upper end to the lower portion of lower plate 35 and is provided with a reinforcing strut 41 which is welded to the central portion of the plate 35 and the central portion of the shank 40. The central portion of the shank 40 is provided with a pair of transversely aligned shear pin holes 42 and the lower end portion of the shank 40 is provided with a pair of transversely aligned pivot pin holes 43. The function of the shank 40 is to receive and support the frontmost moldboard assembly, denoted generally by the numeral 45.

Figure 4:
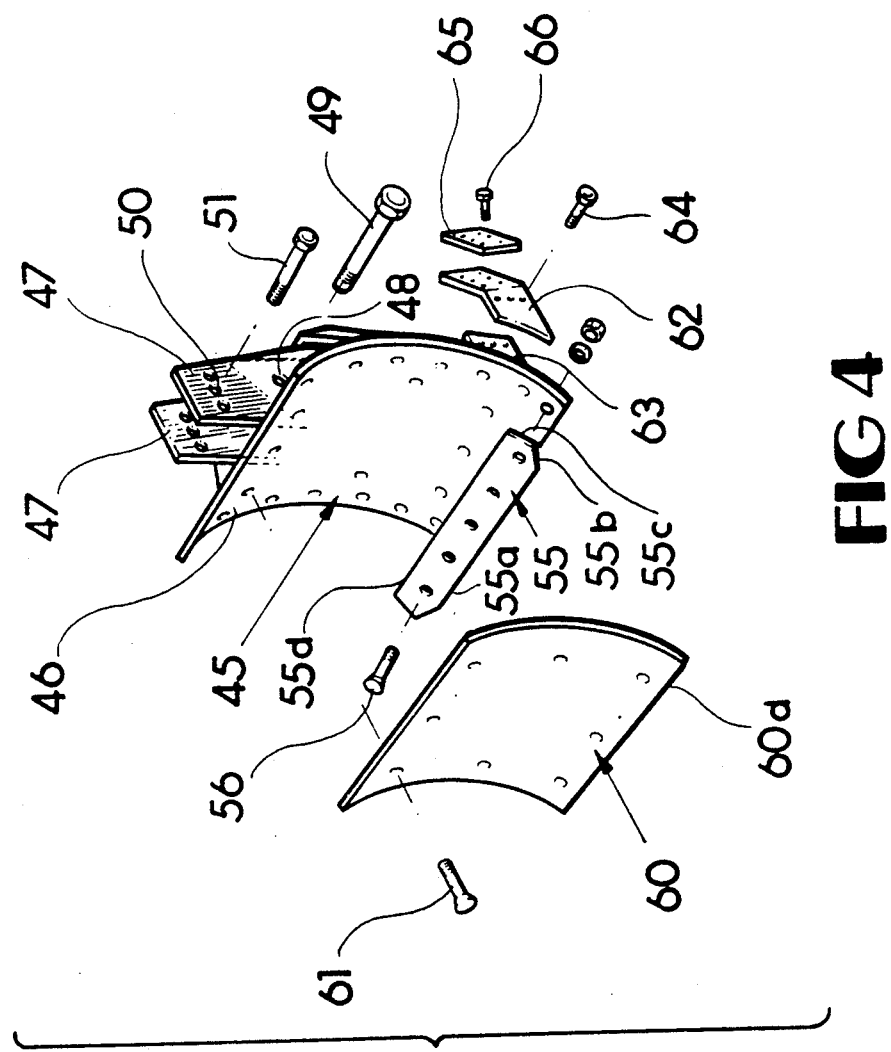
FIG. 4 is an exploded perspective view of the moldboard assembly of the present invention.

As shown in FIG. 4, each moldboard assembly 45 is a bidirectional moldboard has a curved moldboard mounting plate, denoted by the numeral 46. This mounting plate 46 is generally rectangular and is evenly curved about a horizontal radius so as to present a concaved front surface and a convexed rear surface. Welded to the central portion of the concaved rear surface of the mounting plate 46 are a pair of opposed upstanding brackets 47 which are provided at their lower ends with transversely aligned pivot pin holes 48 which, when aligned with the holes 43 of a shank 40, receive the pivot pin 49.

Above the holes 48, the brackets 47 are provided with a plurality of circumferentially spaced shear pin holes 50, pairs of which are transversely aligned with each other. Holes 50 are arranged in an arc and pairs of holes 50 are selectively alignable with holes 42 of shank 40. Thus, when the pivot pin 49 is received through the holes 48 and 43, these shear pin holes 50 can be selectively aligned with the shear pin hole 42 of the shank 40. A shear pin in the form of a bolt 51 can pass through the aligned pair of holes 50 and 42 for mounting the plate 45 in a plurality (3) different angular positions. In one position the mounting plate 46 is in an upwardly tilted position or in a normal position, or in a downwardly tilted position, depending upon the alignment of the holes 50 with the holes 42.

Mounted on the front surface at the bottom edge portion of the moldboard 46 is a flat, hard steel plow point 55, which is bolted by a plurality of bolts 56 to the bottom edge portion of the moldboard plate 45. This plow point 55 is a flat generally rectangular member which has a forward edge 55a for engaging the ground. The ends 55b of the front edge taper outwardly and rearwardly while the trailing edge 55c tapers inwardly to the upper back edge 55d. The back edge 55d is straight and is adapted to be closely adjacent to the lower edge 60d of an arcuate replaceable face or wing 60. This wing 60 is formed of steel and is curved to be concentric with and received on the front surface of the moldboard plate 46. Appropriate bolts 61 secure the removable wing 60 in place. Alternatively, the wing 60 may be made of UHMW plastic, in which case additional bolts are required to support the wing 60 in place. Wing 60 covers the remaining portion of the moldboard mounting plate 45, above plow point 55.

At the rear of the moldboard mounting plates 46 are a pair of laterally opposed inwardly tapering slide mounting plates 62 which are bolted to brackets 63, the brackets 63 being welded to the rear portion of the moldboard mounting plate 46. The slide mounting plate 62 is bolted to this plate 63 by bolts 64. A rectangular slide 65 is bolted by bolts 66 to the outer surface of each slide mounting plate 62. The slides 65 protrude below the mounting plate 46 and act as deflectors to deflect the dirt which has been turned by the moldboard assembly 45.

It will be understood that when this moldboard assembly 45 strikes a hard object, it will shear the shear pin 51 and thereby cause the moldboard assembly 45 to pivot rearwardly and upwardly about the pivot pin 49.

Figure 5:
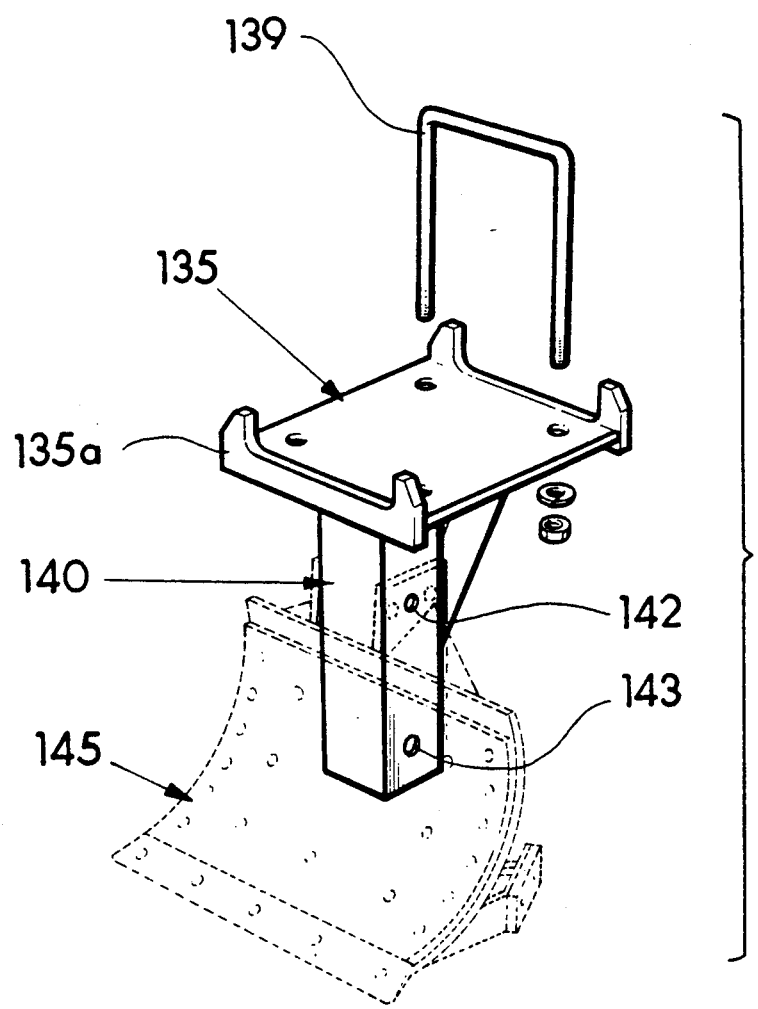
FIG. 5 is a perspective view of a portion of the intermediate shank for supporting an intermediate moldboard in the present invention.

The intermediate plow gangs, which are longitudinally spaced from each other on the tool bar 30, rearwardly of the forwardmost gang, do not require the plates 36 nor do they require the plates 35b, 35c, 36b or 36c. Hence, the lower plate 135 seen in FIG. 5 and its C-shaped cradle members 135a require only U bolts, such as U bolt 139 for removably mounting the intermediate shank 140 on tool bar 30. When appropriately bolted in place, the intermediate gangs have longitudinally spaced shank assemblies, each having a downwardly protruding shank 140 with their pivot pin holes 143 and their shear pin holes 142 for receiving the moldboard assembly such as the moldboard assembly 145.

Figure 6:
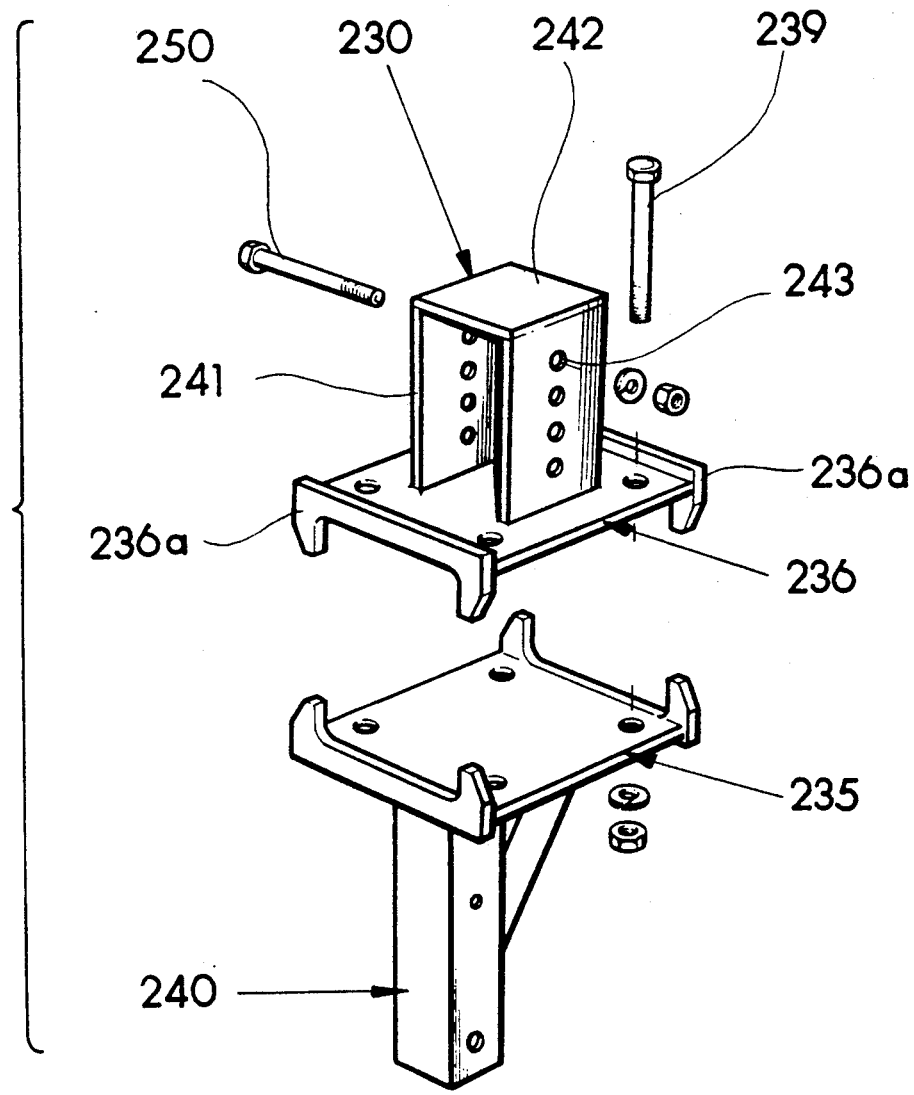
FIG. 6 is an exploded perspective view of the rear shank and gang wheel mount for supporting the moldboard and also the gauge wheel assembly of the present invention.

The rearmost intermediate plow gang along the tool bar 30 is shown in FIG. 6 and includes the conventional bottom plate 235 its downwardly extending shank 240, corresponding to the plates 35 and 135 and shank 40 and 140. It receives a conventional moldboard assembly. What is different about the rear intermediate gang is that it is provided with a gauge wheel boom mounting member, denoted generally by the numeral 230. This gauge wheel mounting member 230 includes a top plate 236 and its guide members 236a which are identical to the plate 36 and its guide members 36a. Bolts 239, similar to bolt 39, mount the plates 235 and 236 straddling the tow bar 30 in a manner similar to the mounting of plates 35 and 36 by bolt 39.

For pivotally receiving the front end portion of the boom 500 of a rear gauge wheel, the plate 236 is provided with the upstanding inverted U shaped mounting member 230 having a pair of upstanding, opposed brackets 241. The upper ends of these opposed brackets are joined by a top plate 242. Vertically spaced pairs of aligned holes 243 are adapted selectively to receive a pivot pin 250 at varying height along the brackets 241.

Figure 7:
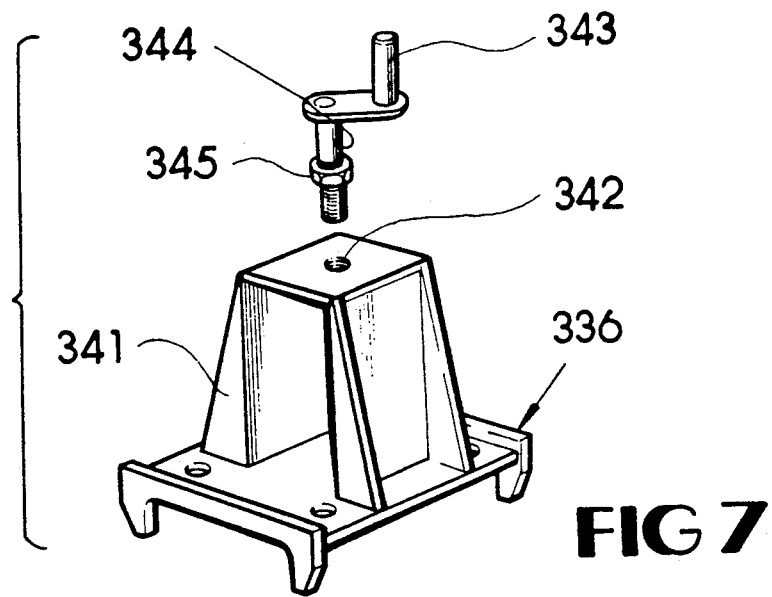
FIG. 7 is an exploded perspective view of the depth mount for the rear wheel assembly of the present invention.

The rearmost gang which is rearwardly of the rearmost intermediate gang includes the usual lower plate and shank, such as used in the preceding gangs; however, the top plate 336, seen in FIG. 7, is attached in the same manner as a plate 36, but includes a second inverted U shaped member having a pair of upstanding brackets 341 and a top plate 342 which extends between the brackets 341. The central portion of the top plate 342 is provided with an internally threaded hole, through which a vertically disposed externally threaded, adjustment bolt 344 protrudes, the bolt having a crank 343 for manually rotating the same. The bolt 344 is a set nut 345 by which the position of the shaft 344 may be fixed. The inner end or lower end of the shaft 344 rides against the upper surface of the forward portion of the doglegged boom 500. The forward end portion 500a of the boom 500 is pivotally carried by the pivot bolt 250 when the bolt 250 protrudes through appropriate holes in the forward end portion of boom 500 and also through appropriate holes in the brackets 241.

Figure 8:
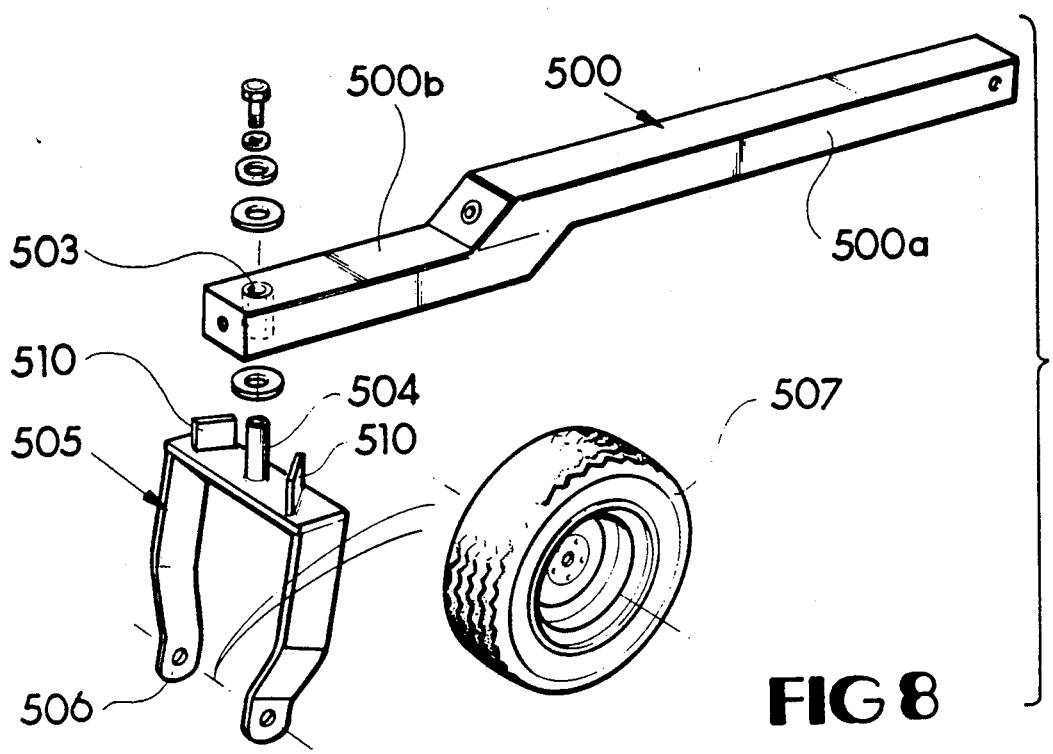
FIG. 8 is an exploded perspective view of the rear wheel assembly of the present invention.

The rear portion 500b of the boom 500 is secured to the forward portion 500a of the boom 500 as illustrated in FIG. 8, the rearmost portion of the rear portion 500b being provided with a vertically disposed sleeve or journal 503 which journals the upstanding shaft 504 for connecting to the crossbar of an inverted U shaped yoke 505. The yoke 505 has a pair of opposed, downwardly protruding arms 506, the lower ends of which carry the transverse shaft of a wheel 507. Because of the caster arrangements provided by the rearwardly and downwardly arms 506 of the yoke 505, wheel 507 will track the path of travel of the plow, when the wheel 507 is riding on the ground.

Boom 500 is mounted by manipulation of the crank 343 (FIG. 7) and through raising or lowering the bolt 250 (FIG. 6) the wheel 507 is incrementally raised or lowered with respect to the plow frame.

Equally spaced on opposite sides of shaft 504 are a pair of stop plates 510 (FIG. 8) which limit the swing of the yoke 505 to the left or to the right, the stop plates 510 being mounted on the upper surface of the crossbar of yoke 505 so as to engage sides of the boom portion 500b when the yoke 505 has pivoted sufficiently to align the wheel 507 with the path of travel of the plow.

Figure 9:
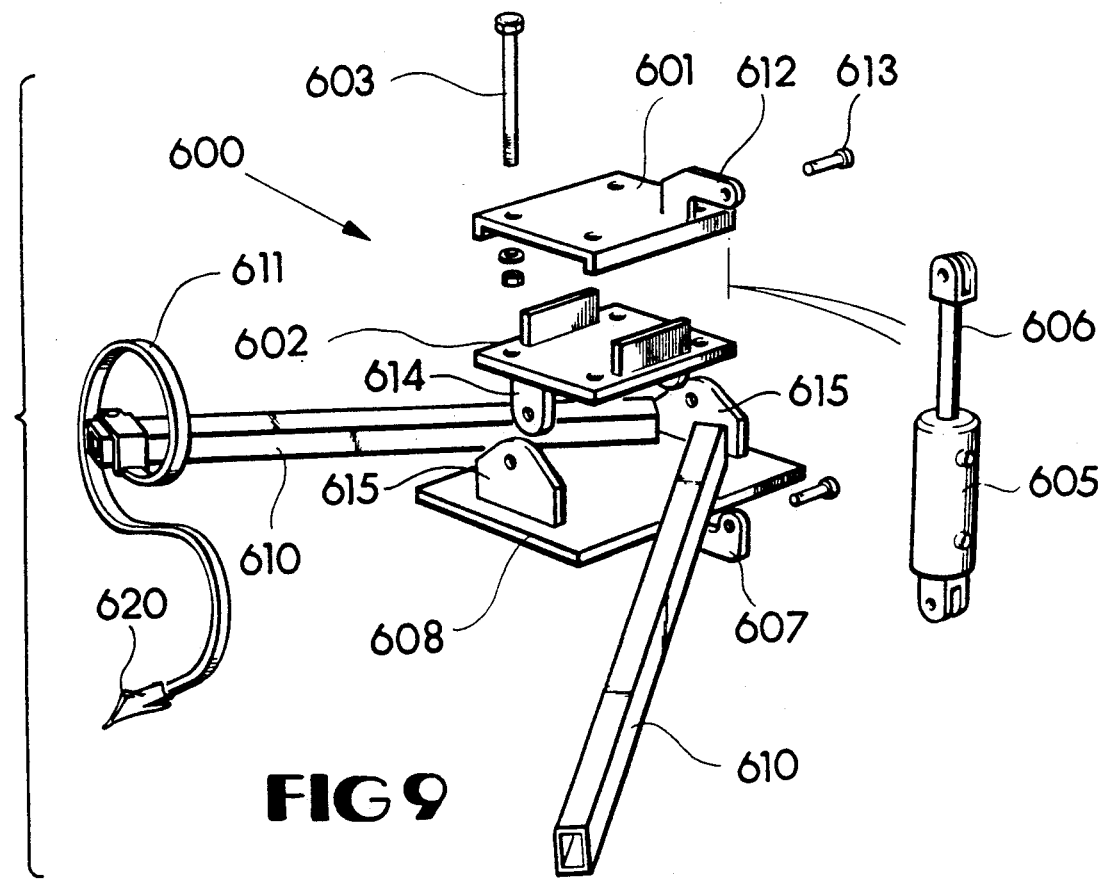
FIG. 9 is a perspective view of the rear marker assembly of the present invention.

Removably mounted on the boom portion 500b, as shown in FIG. 1, forwardly of the yoke 505, there is provided a row marker 600 to mark a line so as to assist the tractor operator in maintaining a uniform distance from the previously plowed furrow. This row marker 600 is shown in detail in FIG. 9 and includes a clamp assembly which has a top plate 601 and a bottom plate 602 which are clamped to the upper surface and the lower surface at the end of the boom section 500b by means of bolts 603 which pass between the corner portions of the two plates 601 and 602. The upper plate 601 is provided with an upstanding and outwardly protruding bracket 612 which pivotally supports by pivot pin 613, one end of a piston 605, the piston being actuated by a cylinder 606, the lower end of which is connected to arm 607 on a pivot plate 608.

Overlapping pairs of brackets 614 and 615 extending from plate 602 and 608, respectively, pivotally suspend pivot plate 608 for pivoting about a longitudinal axis. Diverging from the pivot plate 608 are a pair of outwardly and rearwardly extending marker carrying arms 610. The proximal ends of the marker arms 610 are welded to the plate 608 for pivoting therewith. The distal ends of these marker arms receive, clamped thereon, S shaped spring members 611, the spring member each curving first upwardly and then forwardly and then downwardly having a central portion which passes beneath the arm 610 and thence rearwardly and downwardly, eventually curving forwardly so as to terminate again beneath the arm 610. These lower end portions are each provided with a pointed plow-like marker 620 which protrudes forwardly and downwardly for producing a mark along the ground, when the marker supporting arm 610 is tilted downwardly. Of course when one carrying arm 610 is tilted down, the other marker carrying arm 610 is tilted up so that the marker 610 on one side is always up and out of the ground when the marker 610 on the other side is engaging the ground and vice-versa.

The hydraulic cylinder 605 is a double-acting cylinder and has two hydraulic lines 621 in FIG. 1 which pass through the forward boom section and thence to the hydraulic line supports on the main frame. From there the hydraulic lines 621 are arranged in parallel with the hydraulic lines 129 which feed to the tool bar 30 pivoting cylinder 32.

Therefore, each time the tool bar 30 is moved to the left by piston 32 for causing the plow gangs to pitch the soil to the right, the left hand marker 620 will be pivoted down so that it marks a line along the unplowed ground inwardly of wheel 507. This line may be followed when the tractor reaches the end of the row and reverses its direction of travel, thereby requiring that the tool bar 30 be shifted to the right by the cylinder 32 and the right hand marker 620 is shifted down by cylinder 605.

Figure 10:
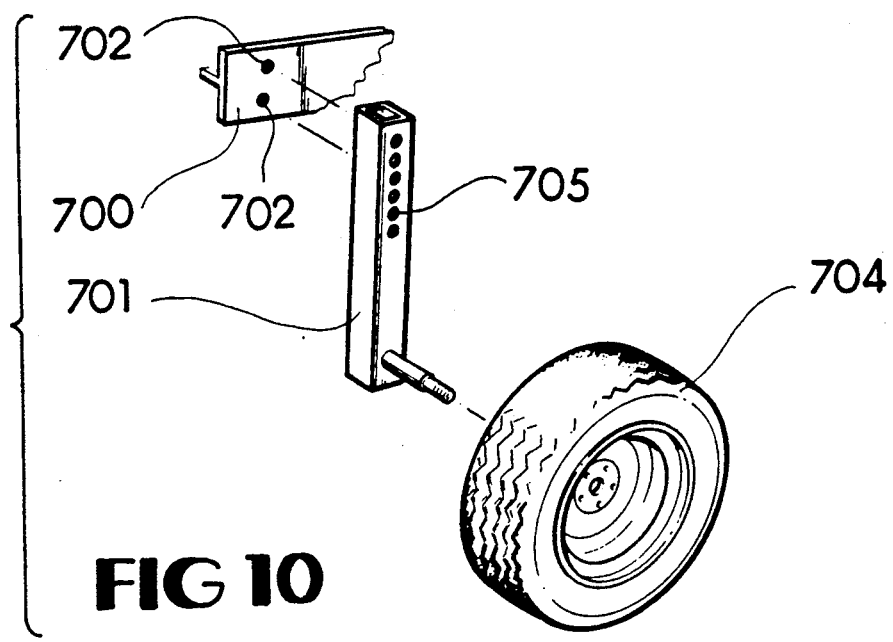
FIG. 10 is a perspective view of side wheel bracket and side wheel of the present invention.

The main frame 10 and 100 of the plows are each provided, at its forward corner portions with longitudinally outer ribs 700 which are respectively provided with vertically spaced holes 702 as shown in FIG. 10.

Downwardly extending struts 701 connected to the ribs 700 carry opposed front wheels 704. The upper portion of these struts 701 are provided with vertically spaced holes 705 through substantial parts of their lengths, so that the effective length of their strut 701 may be adjusted, as desired. The wheels 704 are forwardly of the center of gravity of the plow and thus they cooperate with the rear gang wheel 507 to act as depth gauges to prescribe the depth to which the moldboards will plow with the in furrow plow, the wheels 704 and the struts 701 are usually removed before the plow is utilized for in furrow plowing.

It will be understood that the plow gangs which are mounted along the tool bar 30 are incrementally adjustable along the length of the tool bar 30 and can be changed for the width of cutting. Since there are usually three plow gangs on the forward portion of the tool bar 30 and only two plow gangs on the rear portion of the tool bar 30, once the tool bar 30 has been pivoted to the left, or the right, as the case may be, it will remain in its pivoted position because the pressure on the forward plow gangs is greater than the pressure on the rear plow gangs.

The cooperation of the three wheels, namely the two front wheels 704 and the rear wheel 507, act as depth gauges to prescribe the depth of plowing which will be accomplished by the plow gangs. The hydraulic cylinder 32 provides for both the movement of the tool bar 30 and the holding of it in its prescribed angular working position, about 0° to 40° to the left or to the right, depending on the direction of travel and/or the desired direction of the roll of the dirt. Since a common problem with farm equipment is a leaking hydraulic system in farm tractors, it is desirable to employ a lock valve (not shown) with the hydraulic system so as to lock out any bypass fluid through the tractor hydraulic system.

By adjusting the positions of the plow gangs along the length of the tool bar 30, the cutting widths of the plow gangs may be varied from about 16 inches to about 20 inches, as desired. The face of the moldboard is covered by a wear surface 60 in the form of the wings which are steel or plastic for easy shedding of the dirt.

On the rear of the tool bar the butt plate 31 which is disposed perpendicularly to the axis of the tool bar 30, provides for the easy attachment of an extension, such as seen in FIG. 11. This extension 730 carries one or more additional plow gangs which can readily be installed and removed therefrom. When such an extension is used, the marker assembly of FIG. 9 must be connected to the end portion of the extension 730, rather than to the end portion of the tool bar 30.

When an extension 730 is used, this will mean that there are more plow gangs arranged rearwardly of the pivot pin 22 and, therefore, it is necessary to provide, in the hydraulic system, the check valve (not shown) discussed above which prevents the leakage of fluid, once the tool bar 30 has been positioned for plowing. This is because the greater number of plow gangs will tend to pivot the tool bar 30 to its centered position, rather than to tend to hold it to one side or the other.

The plastic moldboard wing 60 is made of a high density polypropylene known as UHMW. The moldboard assembly has a curved moldboard 46 which extends along a 13½ inch to 14½ inch center line vertical radius distance of approximately 24 inches and extends approximately 24 inches horizontally. The leading or cutting edge of the moldboard point or share 55, is provided with a point that extends horizontally along the lower edge and has two cutting edges 55a and 55b, one at each end, so that the ground may be engaged equally when the plow is rotated either to the right or to the left. The back of the moldboard 46 is fitted with two vertically disposed opposed, parallel brackets or backbones 47 which provide for the mounting of the moldboard assembly to the shank 40, or 340, as the case may be, solely by the pivot pin or bolt 49 and the shear pin or shear bolt 51 which is disposed thereabove. Thus, the mounting bolt or pivot pin 51 provides an axis for the moldboard assembly to pivot when the shear bolt is sheared. The face of the moldboard is fitted with the wing 60 that provides a wear surface as the plow engages the ground. The wing 60 has been so designed that it may be rotated 180° so as to provide maximum life. The brackets 47 on the moldboard assembly are designed with a series of three holes 50 that provide for tilting of the moldboard vertically about the main mounting bolt or pivot pin 49, and so that the angle of mounting of the moldboard can be ready to allow for maximum penetration and rolling of the earth or a covering effect of the earth as it is rolled for varying types of soil conditions.

The symmetrical or geometric design of each plow gang and its ability to be moved forwardly and rearwardly along the tool bar 30 allows for the changes in width of the cut and the movement of the tool bar horizontally along with the tilting ability of the moldboard assembly provide a very unique plow system which has the ability to engage the ground under various soil conditions and to cover excessive litter which has accumulated on the ground while maintaining a level plowing condition.

The single rear wheel 507 and the opposed front wheels 704 are desirable because of the weight of the plow and these wheels 507 and 704 enable the plow to remain level as it is plowing through various soil conditions. The rear wheel 507 is mounted so that it provides for both vertical and horizontal movement so that the rear wheel 507 is positioned to run about an axis which is perpendicular to the path of travel of the plow, regardless of whether tool bar 30 is rotated to the left or to the right.

From the foregoing description, the operation of the present plow should be apparent. The plow is attached by its three hitches to the three hitches of a conventional tractor. By manipulating the top hitch of the tractor, the plow can be tilted so as to lift the wheels 704 and 507 off of the ground and also lift all of the moldboards off of the ground. The tractor can then be driven to any designated location to begin plowing. It is preferable to operate the hydraulic system so as to move the boom or tool bar 30 to the left or the right, prior to the time that the plow is lowered onto the ground. When the boom has been positioned, as desired, the plow is lowered so that the wheels rest upon the ground and so that the inner point 620 also rests upon the ground. Then the tractor is operated so as to begin plowing. Each time the plow reaches the end of a furrow, the plow should be lifted off of the ground as the tractor is turned to being a subsequent operation. Furthermore, the tool bar 30 should also be shifted from one angular position to the other. This shifting, of course, is accomplished by the control on the tractor (not shown) which manipulates the hydraulic system. When the tool bar 30 is shifted, the marker assembly is also shifted so that at all times, the inner marker 620 is the one to be engaging the ground.

After making a 180° turn at the end of the furrow, the operator of the tractor simply follows the line on the ground which has been previously marked by the marker 620. As the plow is moved along its path of travel, and the moldboards have one end or the other facing the direction of travel so that the ground is turned by each of the moldboards as they move along the path of travel of the tractor.

As pointed out previously, the plow gangs can be readily removed from the boom or tool bar 30 and an extension such as shown in FIG. 11 can be added to the tool bar 30, if desired. The wheels 704 can be adjusted vertically and he position of the rear wheel 507 can be adjusted by the crank 343 so as to regulate the depth to which the moldboards will penetrate.

It will be obvious to those skilled in the art that many variations may be made in the embodiment here chosen for the purpose of illustrating the present invention, without departing from the scope thereof as defined by the appended claims.

I claim:

1. A reversible plow of the type having a frame, an elongated tool bar pivotally secured to said frame for swinging about a vertical axis, support means for supporting a bidirectional moldboard suspended from said tool bar wherein said bidirectional moldboard is arcuate about a horizontal axis, and an arcuate moldboard wear plate conforming in shape to and removably secured to a front earth engaging surface of said moldboard, said moldboard plate being reversible so that it is selectively received on said moldboard in either of two positions.

2. The plow defined in claim 1 including a straight generally rectangular blade secured to said moldboard for engaging the ground when said plow is in plowing relationship to the ground.

3. A plow of the type having a frame, a tool bar pivotally supported by its intermediate portion on said frame for swinging about a vertical axis, and a plurality of moldboards supported in spaced relationship therealong, the improvement comprising a pair of forward wheels protruding from said frame for engaging the ground, a rear wheel protruding from the rear end portion of said tool bar for engaging the ground rearwardly of said front wheels and support means for said rear wheel, said support means being pivotable for disposing said wheel for travel along a ground in a path parallel to the path of said front wheels, a pair of markers protruding sidewise from the rear end portion of said tool bar which are movable for selectively engaging the ground for selectively making a mark adjacent to the path of travel of said plow.

4. The plow defined in claim 3 including means for supporting said markers and hydraulic means for shifting the position of said markers.

5. The plow defined in claim 4 including hydraulic means for shifting said tool bar, and means for synchronizing the shifting of said tool bar and said markers with each other.

6. A plow comprising a frame, a tool bar pivotally mounted in said frame for pivoting about a vertical axis, moldboards carried by said tool bar, said moldboards being spaced along the length of said tool bar for engaging the ground beneath said tool bar, longitudinally extending pivot means secured along a central longitudinal axis of said frame, transversely extending bar mounted on said pivot means, an upstanding hitch secured to said transverse bar and generally vertically aligned with said longitudinal axis, said hitch being adapted to be secured to the central hitch of a tractor, hitch means on opposite sides of said first mentioned hitch and secured to said transverse bar, and hydraulic means extending between said frame and said transverse bar for pivotally moving said frame with respect to said transverse bar.

7. A plow comprising a frame, a tool bar pivotally mounted in said frame for pivoting about a vertical axis, and moldboards carried by said tool bar, said moldboards being spaced along the length of said tool bar for engaging the ground beneath said tool bar, longitudinally extending pivot means secured along a central longitudinal axis of said frame, a transverse bar mounted on said pivot means, an upstanding hitch secured to said transverse bar and generally vertically aligned with said longitudinal axis, said hitch being adapted to be secured to the central hitch of a tractor and hitch means on opposite sides of said first mentioned hitch and secured to said transverse bar, and hydraulic means extending between said frame and said transverse bar for pivotally moving said frame with respect to said transverse bar said hydraulic means including a hydraulic cylinder.

8. A reversible plow of the type having a frame, a tool bar pivotally mounted to said frame for swinging from one position to another about a vertical axis of said frame, said tool bar having a portion thereof protruding rearwardly of said frame, a boom mounted on said rearwardly extending portion of said tool bar and protruding rearwardly therefrom and a wheel pivotally mounted on said boot, means for pivotally mounting said boom to said tool bar, means for incrementally adjusting the pivotal position of said boom with respect to said tool bar, a pair of markers pivotally carried by said boom, said markers being spaced from each other, and means for pivoting said markers so that one marker selectively engages the ground as the plow is moved for plowing action.

9. A plow for being towed by a tractor comprising a frame, a tool bar pivotally mounted in said frame for pivoting about a generally vertical axis, moldboards carried by said tool bar, said moldboards being spaced along the length of said tool bar for engaging the ground beneath said tool bar, central pivot means secured along a central longitudinal axis of said frame, a transverse bar mounted by its central portion to said pivot means, spaced side hitches on said transverse bar for hitching to the side hitches of said tractor, and tilt arcuating connected between said frame and said transverse bar for tilting the bar and the frame with respect to each other whereby the frame is selectively tilted to the left side or the right side about said central longitudinal axis with respect to said transverse bar.

10. The plow defined in claim 9 including an upstanding central hitch fixed by its lower end portion to said transverse bar for connection to the central hitch of a tractor.

11. The plow defined in claim 9 wherein said tilt actuating means is a hydraulic piston and cylinder connected between said frame and said transverse bar.

12. The plow defined in claim 9 in which said tilt actuating means tilts said frame with respect to said transverse bar by an equal amount to the left and right about said central longitudinal axis.

13. The plow defined in claim 9 wherein said frame is a flat generally horizontal frame, said transverse bar is received within a forward portion of said frame, said central pivot means is secured to an intermediate portion of said transverse bar and said side hitches extend from said transverse bar forwardly and below the forward portion of said frame.

14. A reversible plow defined in claim 13 wherein said moldboards are bidirectional moldboards disposed along parallel transverse axes perpendicular to said tool bar and said moldboards are pivotable about transverse axes with respect to said tool bar so that they individually pivot rearwardly and forwardly only about a horizontal axis with respect to said tool bar; and yieldable means connected to each moldboard for resisting pivotal movement of said moldboards.

* * * * *